(12) United States Patent
Sadamitsu et al.

(10) Patent No.: US 10,480,396 B2
(45) Date of Patent: Nov. 19, 2019

(54) SPACER AND ELECTRIC SUPERCHARGER

(71) Applicant: TOYOTA JIDOSHA KABUSHIKI KAISHA, Toyota-shi, Aichi-ken (JP)

(72) Inventors: Takahiro Sadamitsu, Miyoshi (JP); Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 214 days.

(21) Appl. No.: 15/707,002

(22) Filed: Sep. 18, 2017

(65) Prior Publication Data

US 2018/0106185 A1 Apr. 19, 2018

(30) Foreign Application Priority Data

Oct. 14, 2016 (JP) ................. 2016-202610

(51) Int. Cl.
| | | |
|---|---|---|
| *F02B 33/40* | (2006.01) | |
| *F02B 39/10* | (2006.01) | |
| *F04D 25/06* | (2006.01) | |
| *F04D 29/059* | (2006.01) | |
| *F16C 19/06* | (2006.01) | |
| *F16C 19/54* | (2006.01) | |
| *F16C 27/06* | (2006.01) | |

(52) U.S. Cl.
CPC ............. *F02B 33/40* (2013.01); *F02B 39/10* (2013.01); *F04D 25/0606* (2013.01); *F04D 29/059* (2013.01); *F16C 19/06* (2013.01); *F16C 19/547* (2013.01); *F16C 27/066* (2013.01); *F05D 2220/40* (2013.01)

(58) Field of Classification Search
CPC ...... F02B 33/40; F02B 39/10; F04D 25/0606; F04D 25/064; F04D 29/059; F05D 2220/40; F16C 19/06; F16C 19/163; F16C 19/547; F16C 2360/44; F16C 25/083; F16C 27/066; F16C 35/063; F16C 35/077
See application file for complete search history.

(56) References Cited

U.S. PATENT DOCUMENTS

| | | | |
|---|---|---|---|
| 3,811,327 A | 5/1974 | Hack | |
| 5,246,352 A * | 9/1993 | Kawakami | ............ F01D 25/164 384/901 |
| 6,617,731 B1 | 9/2003 | Goodnick et al. | |

(Continued)

FOREIGN PATENT DOCUMENTS

| | | |
|---|---|---|
| CN | 101160462 A | 4/2008 |
| DE | 2 217 264 C2 | 5/1974 |

(Continued)

*Primary Examiner* — Jesse S Bogue
(74) *Attorney, Agent, or Firm* — Finnegan, Henderson, Farabow, Garrett & Dunner, LLP

(57) ABSTRACT

A spacer is disposed between a rotor and a bearing of an electric supercharger to fix the rotor. The spacer has a tapered surface with a diameter decreasing toward the bearing in an outer circumferential surface of the spacer. An area of an end surface of the spacer on a rotor side is larger than an area of an end surface of the spacer on a bearing side. A balance correction part that corrects balance of the spacer is disposed inside a recess formed in the end surface. A region of the end surface located on an outer side of the recess relative to a central axis of the spacer constitutes a surface coming in contact with the rotor.

10 Claims, 4 Drawing Sheets

(56) References Cited

U.S. PATENT DOCUMENTS

| | | | |
|---|---|---|---|
| 9,470,140 B2* | 10/2016 | An | H02K 5/1732 |
| 9,979,245 B2* | 5/2018 | Maeda | H02K 1/2733 |
| 2005/0275961 A1 | 12/2005 | Chung et al. | |
| 2014/0125208 A1* | 5/2014 | Yamashita | F02C 6/12 |
| | | | 310/68 B |
| 2014/0147306 A1* | 5/2014 | Yamashita | F02B 37/10 |
| | | | 417/410.1 |
| 2017/0082115 A1* | 3/2017 | Oshita | F02B 33/40 |
| 2017/0204868 A1* | 7/2017 | Oshita | H02K 5/24 |
| 2018/0156280 A1* | 6/2018 | Iizuka | F16C 35/063 |

FOREIGN PATENT DOCUMENTS

| | | |
|---|---|---|
| DE | 33 00 889 A1 | 7/1984 |
| GB | 2 134 991 A | 8/1984 |
| JP | 09-014188 A | 1/1997 |
| JP | 2000-145469 | 5/2000 |
| JP | 2006-291923 A | 10/2006 |
| WO | WO2006/112372 A1 | 10/2006 |

* cited by examiner

SPACER AND ELECTRIC SUPERCHARGER

INCORPORATION BY REFERENCE

The disclosure of Japanese Patent Application No. 2016-202610 filed on Oct. 14, 2016 including the specification, drawings and abstract is incorporated herein by reference in its entirety.

BACKGROUND

1. Technical Field

The present disclosure relates to a spacer and an electric supercharger, and relates to, for example, a spacer that is disposed between a rotor and a bearing of an electric supercharger to fix the rotor, and to an electric supercharger employing this spacer.

2. Description of Related Art

A typical electric supercharger supercharges intake air by rotating a rotor using magnetic force of a stator and thereby rotating a turbine fixed at a leading end of a shaft through the shaft. As disclosed in Japanese Patent Application Publication No. 2000-145469, such an electric supercharger has a spacer disposed between the rotor and the bearing to fix the rotor, and this spacer rotates with the rotor.

SUMMARY

Since the spacer rotates with the rotor, it is preferable that an unbalanced part of the spacer (i.e., a part with a manufacturing error that causes a deviation of the center of gravity of the spacer from the central axis of the spacer) be corrected during manufacturing.

Here, as shown in FIG. 3, a spacer 101 of JP 2000-145469 A has a conical shape with a diameter decreasing from the rotor side toward the bearing side as its basic form, and an end surface 101*a* of the spacer 101 on the bearing side comes in contact with the bearing, while an end surface 101*b* of the spacer 101 on the rotor side comes in contact with the rotor.

In the case where a balance correction part that corrects an unbalanced part is formed in the spacer 101 of JP 2000-145469 A, the correcting effect of this balance correction part depends on the radius of a portion, cut out from the spacer 101 to form the balance correction part, multiplied by the mass of that portion. However, designing the balance correction part is complicated by the fact that a circumferential surface 101*c* of the spacer 101 is a tapered surface.

The area of the end surface 101*a* of the spacer 101 is not large enough to form the balance correction part therein. Moreover, if the balance correction part is formed in the end surface 101*a* of the spacer 101, a burr of the balance correction part is formed in the end surface 101*a*, which makes it difficult to secure the flatness required to appropriately bring the spacer 101 into contact with the bearing. Accordingly, it becomes difficult to appropriately fix (fasten) the spacer 101 to the rotor.

On the other hand, the area of the end surface 101*b* of the spacer 101 is larger than the area of the end surface 101*a* of the spacer 101, and is large enough to form the balance correction part therein. Thus, the only location where the balance correction part can be formed is the end surface 101*b* of the spacer 101. However, if the balance correction part is formed in the end surface 101*b* of the spacer 101, a burr 102 is formed in the end surface 101*b* as shown in FIG. 4, which makes it difficult to secure the flatness required to appropriately bring the spacer 101 into contact with the rotor. Thus, it becomes difficult to appropriately fix the spacer to the rotor.

The present disclosure realizes a spacer in which there is little deviation of the center of gravity of the spacer from the central axis of the spacer and which can be appropriately fixed to the rotor, and further realizes an electric supercharger.

A spacer according to an aspect of the present disclosure is a spacer that is disposed, to fix a rotor of an electric supercharger, between the rotor and a bearing disposed in a direction of a rotational axis of the rotor relative to the rotor, the spacer including a tapered surface with a diameter decreasing toward the bearing in an outer circumferential surface of the spacer, wherein: the area of an end surface of the spacer on a rotor side may be larger than the area of an end surface of the spacer on a bearing side; a balance correction part that corrects balance of the spacer may be disposed inside a recess formed in the end surface of the spacer on the rotor side; and, a region of the end surface located on an outer side of the recess relative to a central axis of the spacer may constitute a surface coming in contact with the rotor. This configuration makes it possible to correct the balance of the spacer and, at the same time, to appropriately bring the region of the end surface of the spacer on the rotor side located on the outer side of the recess relative to the central axis of the spacer into contact with the rotor. Thus, there is little deviation of the center of gravity of the spacer from the central axis of the spacer, so that the spacer can be appropriately fixed to the rotor.

The spacer may have a conical outer shape. The spacer may include a perforated portion, and the central axis of the spacer may be disposed on the rotational axis of the rotor.

In the above spacer, the balance correction part may be a weight adjustment part that is formed in the spacer so that the center of gravity of the spacer is located on the central axis of the spacer.

In the above spacer, the balance correction part may include an excavated portion formed in the spacer, and a burr resulting from formation of the excavated portion. The recess may be formed so as to have a diameter around the central axis of the spacer, and may have a depth that allows the recess to accommodate the burr of the balance correction part.

In the above spacer, the balance correction part may be a weight provided inside the recess.

An electric supercharger according to another aspect of the present disclosure is an electric supercharger in which a spacer is disposed, to fix a rotor, between the rotor and a bearing disposed in a direction of a rotational axis of the rotor relative to the rotor, the electric supercharger including: a housing that supports a shaft through the bearing and has an air flow passage; a turbine that is disposed inside the flow passage and fixed at a leading end of the shaft; and a stator that surrounds the rotor and is fixed to the housing, wherein: the area of an end surface of the spacer on a rotor side may be larger than the area of an end surface of the spacer on a bearing side; the spacer may have a tapered surface with a diameter decreasing toward the bearing in an outer circumferential surface of the spacer; a balance correction part that corrects balance of the spacer may be disposed inside a recess formed in the end surface of the spacer on the rotor side; and, a region of the end surface located on an outer side of the recess relative to a central axis of the spacer may constitute a surface coming in contact with the rotor. This configuration makes it possible to correct the balance of the spacer and, at the same time, to appropriately bring the region of the end surface of the spacer on the rotor side located on the outer side of the recess relative to the central axis of the spacer into contact with the rotor. Thus, there is little deviation of the center of gravity of the spacer from the central axis of the spacer, so that the spacer can be appropriately fixed to the rotor.

According to an aspect of the present disclosure, it is possible to realize a spacer in which there is little deviation of the center of gravity of the spacer from the central axis of the spacer and which can be appropriately fixed to the rotor, and to further realize an electric supercharger.

In the above electric supercharger, the spacer may have a conical outer shape. The spacer may include a perforated portion that extends through the spacer in a left-right direction of the electric supercharger, and the central axis of the spacer may be disposed on the rotational axis of the shaft.

In the above electric supercharger, the balance correction part may be a weight adjustment part that is formed in the spacer so that the center of gravity of the spacer is located on the central axis of the spacer.

In the above electric supercharger, the balance correction part may include an excavated portion formed in the spacer, and a burr resulting from formation of the excavated portion. The recess may be formed so as to have a diameter around the central axis of the spacer, and may have a depth that allows the recess to accommodate the burr of the balance correction part.

In the above electric supercharger, the balance correction part may be a weight provided inside the recess.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A specific embodiment to which the present disclosure is applied will be described below in detail with reference to the drawings. However, the present disclosure is not limited to the following embodiment. To clarify the illustration, the following description and the drawings are simplified where appropriate.

Figure 1:
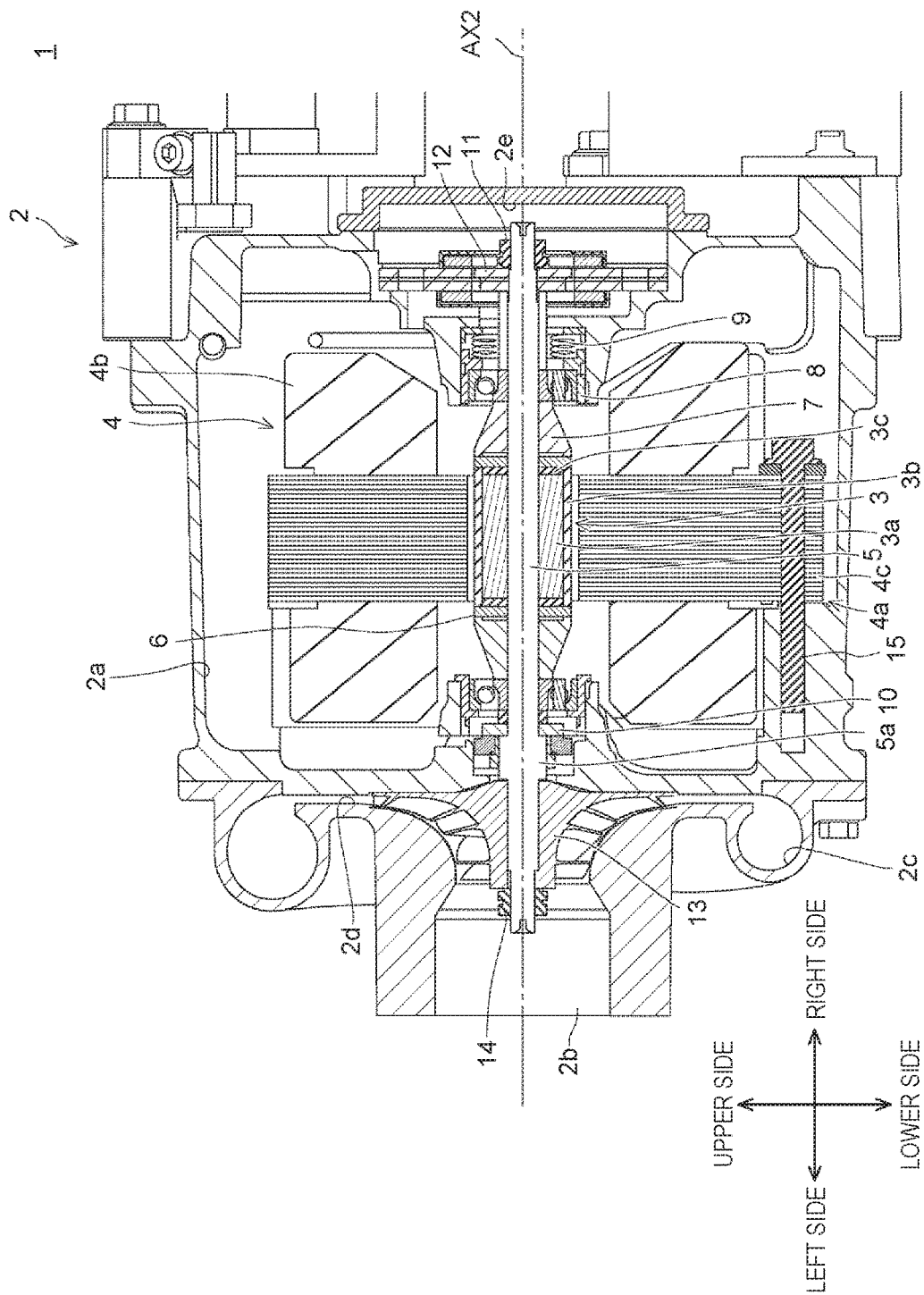
FIG. 1 is a sectional view schematically showing an electric supercharger of an embodiment.

First, the basic configuration of an electric supercharger of this embodiment will be described. FIG. 1 is a sectional view schematically showing the electric supercharger of this embodiment. To clarify the illustration, an upper-lower direction and a left-right direction of the electric supercharger will be specified as indicated in FIG. 1 for the following description, but these directions are changed as appropriate according to the form of use of the electric supercharger.

The electric supercharger 1 of this embodiment is suitable as a compressor of an air supply system of a fuel cell (FC) system, and as shown in FIG. 1, includes a housing 2, a rotor 3, and a stator 4. Although the electric supercharger 1 of this embodiment is configured as a compressor of an air supply system of an FC system, the electric supercharger 1 can also be used as another type of compressor.

The housing 2 includes: a first housing part 2a where the rotor 3, the stator 4, etc. are housed; an air intake port 2b; an exhaust port 2c through which air taken in through the intake port 2b is discharged; and a flow passage 2d that provides communication between the intake port 2b and the exhaust port 2c.

As shown in FIG. 1, the rotor 3 includes a magnet 3a, a tubular body 3b, and end plates 3c. The magnet 3a has a cylindrical shape with a perforated portion extending through the magnet 3a in a left-right direction of the rotor 3. The tubular body 3b has a cylindrical shape with a perforated portion extending through the tubular body 3b in the left-right direction of the rotor 3, and the magnet 3a is press-fitted inside the perforated portion of the tubular body 3b so that a compressive stress is applied to the magnet 3a. The end plates 3c each have a perforated portion with an inside diameter substantially equal to that of the perforated portion of the magnet 3a, and are fitted inside the perforated portion of the tubular body 3b so as to sandwich the magnet 3a from a left-right direction of the magnet 3a.

A shaft 5 extending in the left-right direction of the electric supercharger 1 is passed through the perforated portions of the magnet 3a and the end plates 3c of the rotor 3. In a state where the rotor 3 is housed inside the first housing part 2a of the housing 2, the rotor 3 is rotatably supported on the housing 2 through the shaft 5.

In this embodiment, the shaft 5 is passed through washers 6, spacers 7, and bearings 8 so that the rotor 3 is sandwiched from the left-right direction of the electric supercharger 1. Thus, the spacer 7 is disposed between the rotor 3 and the bearing 8 that is disposed in an extension direction of a rotational axis AX2 of the shaft 5 (i.e., a rotational axis of the rotor 3) relative to the rotor 3. The shaft 5 is rotatably supported on the housing 2 through the bearings 8. Accordingly, the rotor 3 is rotatably supported on the housing 2 through the shaft 5. The specific shape of the spacer 7 will be described later.

Moreover, the shaft 5 is passed through a preloading spring 9 and a seal material 10 so that the rotor 3, the left and right washers 6, the left and right spacers 7, and the left and right bearings 8 are sandwiched from the left-right direction of the electric supercharger 1. The rotor 3, the left and right washers 6, the left and right spacers 7, the left and right bearings 8, and the seal material 10 are pressed into a flange 5a formed on the shaft 5 by a restoring force of the preloading spring 9 that is compressed as a nut 11 is screwed on a right end of the shaft 5. Thus, the rotor 3, the left and right washers 6, the left and right spacers 7, the left and right bearings 8, and the seal material 10 are fixed to the shaft 5.

A resolver 12 that detects a rotation angle of the rotor 3 is provided at a right-side portion of the shaft 5. Although the resolver 12 is housed inside a second housing part 2e formed inside the housing 2 in this embodiment, the arrangement of the resolver 12 is not limited.

A left-side portion of the shaft 5 (a portion of the shaft 5 on the left side of the flange 5a) protrudes into the flow passage 2d of the housing 2. The left-side portion of the shaft 5 is passed through a turbine 13 that is disposed inside the flow passage 2d of the housing 2, and a nut 14 is screwed on a left end of the shaft 5 so as to fix the turbine 13 between the nut 14 and the flange 5a of the shaft 5. Thus, when the shaft 5 rotates, air suctioned through the intake port 2b of the housing 2 is compressed by the turbine 13 and discharged through the exhaust port 2c of the housing 2, and this air is then supplied to an FC stack, for example.

The stator 4 is disposed so as to surround the rotor 3, and is fixed to the housing 2 in a state where the stator 4 is housed inside the first housing part 2a of the housing 2. The stator 4 includes a stator core 4a and a stator coil 4b. The stator core 4a is composed of a stack of a plurality of magnetic steel sheets 4c, and the rotor 3 extends through the inside of the stator core 4a. The stator core 4a is fixed to the housing 2 with a bolt 15. The stator coil 4b is wound around predetermined teeth formed in the stator core 4a.

Figure 2:
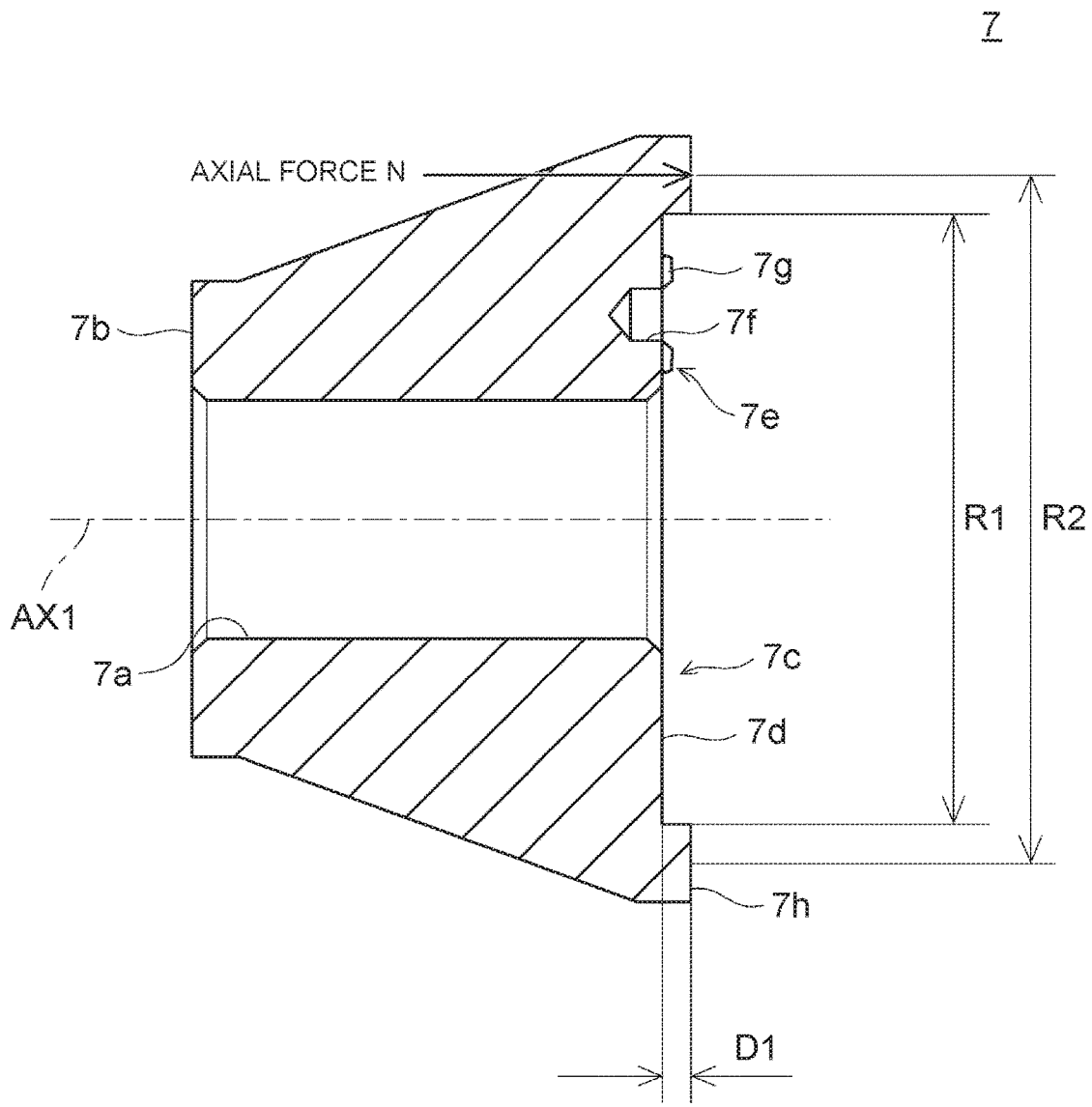
FIG. 2 is a sectional view schematically showing a spacer used in the electric supercharger of the embodiment.
Figure 3:
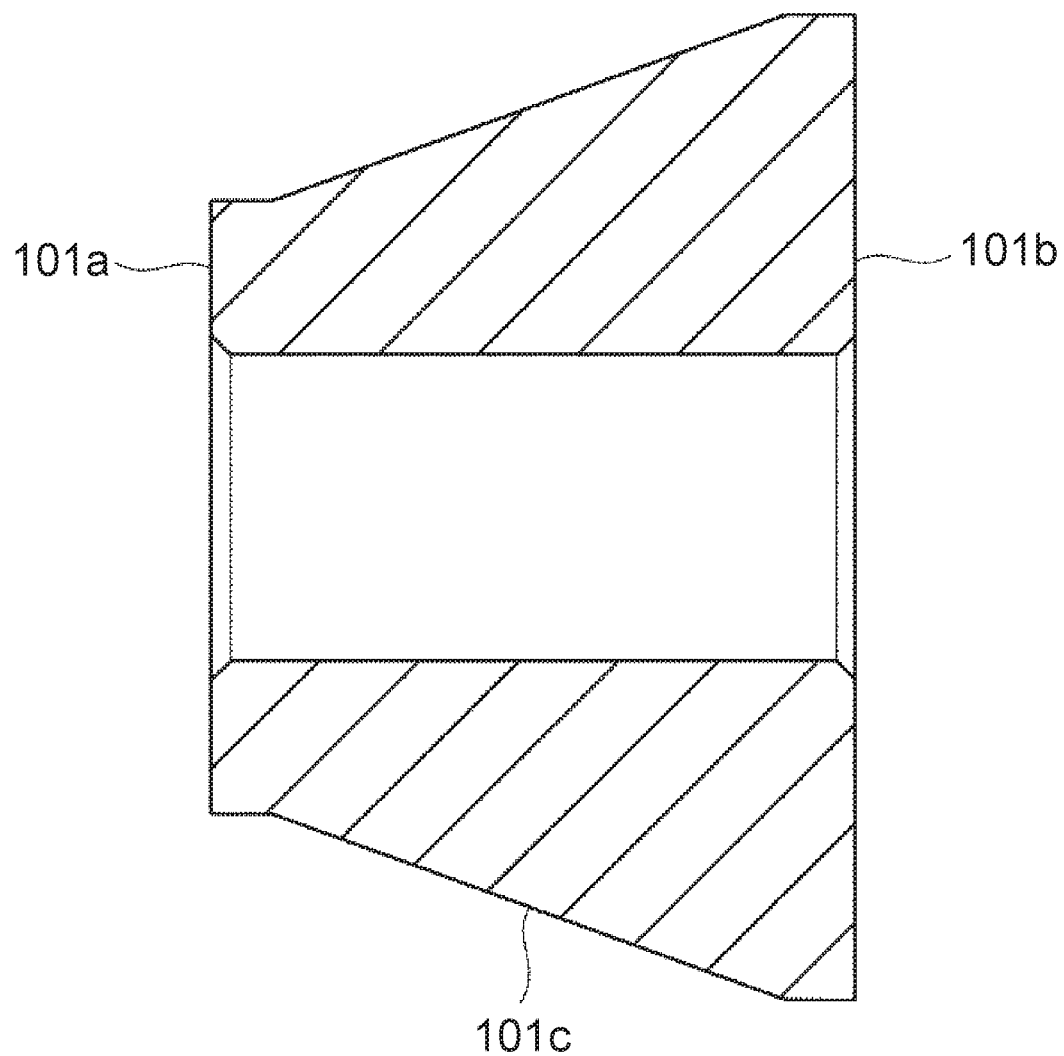
FIG. 3 is a sectional view schematically showing a spacer used in a typical electric supercharger.
Figure 4:
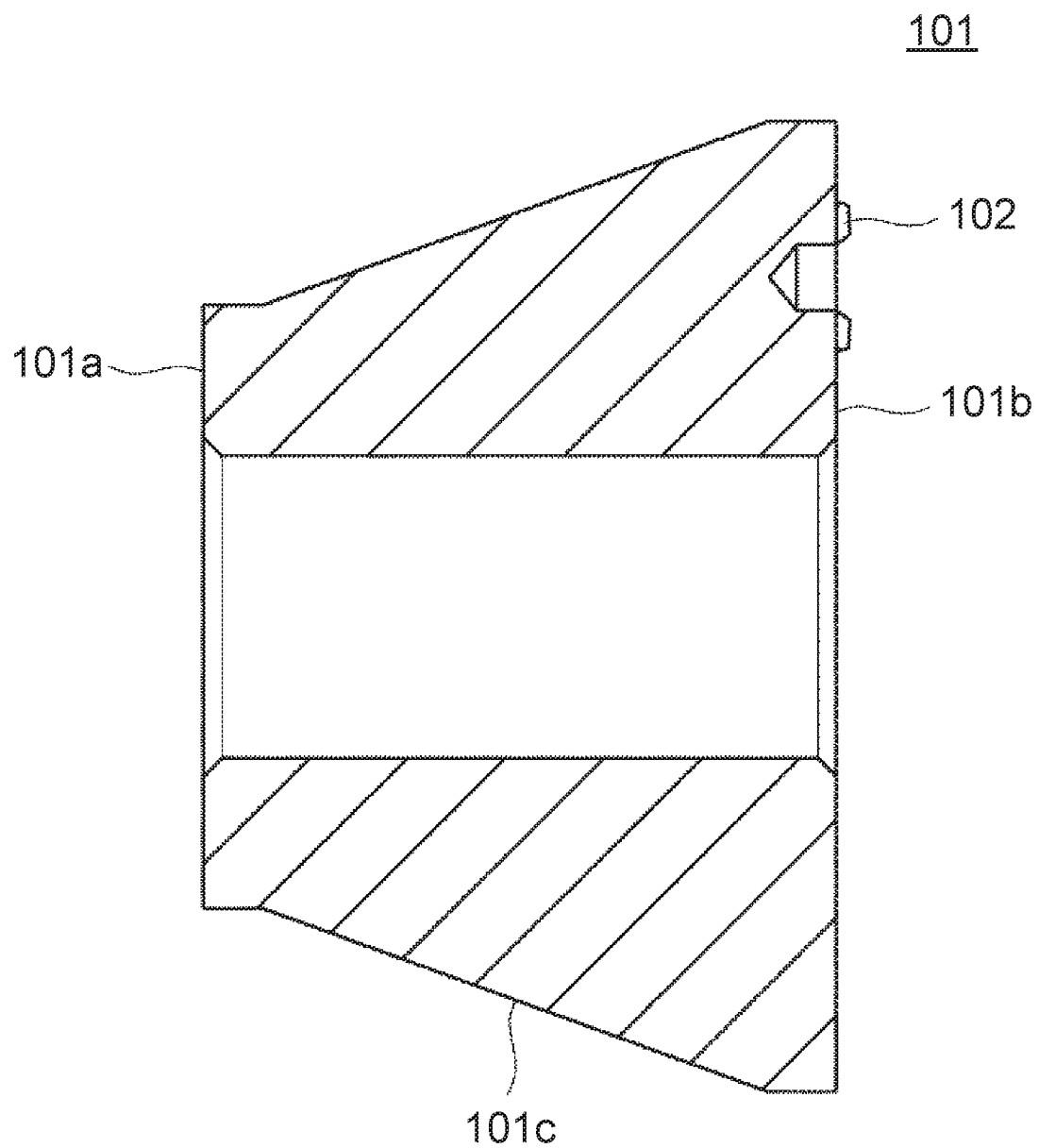
FIG. 4 is a sectional view schematically showing a state where a balance correction part is formed in the spacer used in a typical electric supercharger.

Next, the configuration of the spacer 7 in the electric supercharger 1 of this embodiment will be described. FIG. 2 is a sectional view schematically showing the spacer in the electric supercharger of this embodiment. While the spacer 7 disposed on the left side of the rotor 3 will be described as a representative, the spacer 7 disposed on the right side has an equivalent configuration.

As shown in FIG. 2, the spacer 7 of this embodiment includes a perforated portion 7a extending through the spacer 7 in the left-right direction of the electric supercharger 1, and a central axis AX1 of the spacer 7 is disposed on the rotational axis AX2 of the shaft 5.

The spacer 7 has a conical outer shape with a diameter decreasing toward the bearing 8 as its basic form. Accordingly, the spacer 7 has a tapered surface with a diameter decreasing toward the bearing 8 in an outer circumferential surface of the spacer 7. The area of an end surface 7c of the spacer 7 on the rotor 3 side is larger than the area of an end surface 7b of the spacer 7 on the bearing 8 side. For example, the outside diameter of the end surface 7b of the spacer 7 is substantially equal to the outside diameter of an inner ring of the bearing 8, and the outside diameter of the end surface 7c of the spacer 7 is substantially equal to the outside diameters of the rotor 3 and the washer 6.

The area of the end surface 7b of the spacer 7 is not large enough to form a balance correction part to be described later therein, while the area of the end surface 7c of the spacer 7 is large enough to form the balance correction part to be described later therein. Thus, the spacer 7 of this embodiment has such a shape that the balance correction part can be formed only in the end surface 7c of the spacer 7.

Although the spacer 7 of this embodiment has a conical shape with the diameter decreasing toward the bearing 8 as its basic form, the spacer 7 may have any shape, provided that the spacer 7 has a tapered surface in a part of the outer circumferential surface and that the area of the end surface 7c of the spacer 7 is larger than the area of the end surface 7b of the spacer 7.

The shaft 5 is passed through the perforated portion 7a of the spacer 7, and the spacer 7 is fixed to the rotor 3 through the washers 6 by an axial force that is exerted as the nut 11 is screwed. Thus, the spacer 7 rotates with the rotor 3 around the shaft 5.

A recess 7d is formed in the end surface 7c of the spacer 7. A balance correction part 7e mentioned above is disposed inside the recess 7d. The balance correction part 7e is a weight adjustment part that is formed in the spacer 7 so that the center of gravity of the spacer 7 is located substantially on the central axis AX1 of the spacer 7. For example, the balance correction part 7e includes an excavated portion 7f formed in the spacer 7, and a burr 7g resulting from formation of the excavated portion 7f. For example, the recess 7d is formed so as to have a diameter R1 around the central axis AX1 of the spacer 7, and has a depth D1 that allows the recess 7d to accommodate the burr 7g of the balance correction part 7e. Alternatively, the balance correction part 7e may be a weight or the like provided inside the recess 7d. A single or a plurality of balance correction parts 7e may be provided.

Of the end surface 7c of the spacer 7, a region 7h located on an outer side of the recess 7d relative to the central axis AX1 constitutes a surface coming in contact with the rotor 3. The area and the like of the region 7h of the end surface 7c of the spacer 7 are set so that a surface pressure acting on the region 7h when the spacer 7 is fixed to the rotor 3 does not exceed an allowable surface pressure of the region 7h.

In this embodiment, the balance correction part 7e is formed inside the recess 7d of the spacer 7. Thus, the burr 7g of the balance correction part 7e is accommodated inside the recess 7d of the spacer 7 and does not protrude toward the rotor 3 beyond the region 7h of the end surface 7c of the spacer 7. Accordingly, the region 7h of the end surface 7c of the spacer 7 can be appropriately brought into contact with the rotor 3. Thus, according to the spacer 7 of this embodiment, the balance of the spacer 7 is corrected and, at the same time, the part of the spacer 7 coming in contact with the rotor 3 is highly flat. According to the spacer 7 of this embodiment, therefore, there is little deviation of the center of gravity of the spacer 7 from the central axis AX1 of the spacer 7, so that the spacer 7 can be appropriately fixed to the rotor 3.

In this case, a fixing torque T with which the spacer 7 is fixed to the rotor 3 can be expressed by <Formula 1> below. Here, the axial force exerted by screwing the nut 11 is N, the diameter of a point of application at which this axial force acts intensively in the region 7h of the end surface 7c of the spacer 7 is R2, and the coefficient of friction of the region 7h of the end surface 7c of the spacer 7 is μ.

$$T = N \times \mu \times (R2/2)$$ <Formula 1>

Even if the recess 7d is not formed in the end surface 7c of the spacer 7 (i.e., even if the end surface 7c of the spacer 7 is substantially flat), it is practically impossible to form a perfectly flat surface, so that the position of contact between the end surface 7c of the spacer 7 and the rotor 3 cannot be stabilized. Thus, depending on the manufacturing error of the spacer 7, the spacer 7 may come in contact with the rotor 3 at a position closer to the central axis AX1 in the end surface 7c of the spacer 7, or may come in contact with the rotor 3 at a position farther from the central axis AX1 in the end surface 7c of the spacer 7.

In the spacer 7 of this embodiment, however, the surface coming in contact with the rotor 3 is limited to the region 7h that is located on the outer side of the recess 7d in the end surface 7c, i.e., the recess 7d does not come in contact with the rotor 3, so that the position of contact with the rotor 3 can be stabilized. Moreover, since the fixing torque T depends on the diameter R2 of the point of application of the axial force, the spacer 7 can be fixed to the rotor 3 with a higher fixing torque than if a region located on an inner side of the region 7h in the end surface 7c comes in contact with the rotor 3.

The present disclosure is not limited to the above embodiment but can be appropriately modified within the scope of the gist of the disclosure.

What is claimed is:

1. A spacer that is disposed, to fix a rotor of an electric supercharger, between the rotor and a bearing disposed in a direction of a rotational axis of the rotor relative to the rotor, the spacer comprising a tapered surface with a diameter decreasing toward the bearing in an outer circumferential surface of the spacer, wherein
an area of an end surface of the spacer on a rotor side is larger than an area of an end surface of the spacer on a bearing side,
a balance correction part that corrects balance of the spacer is disposed inside a recess formed in the end surface of the spacer on the rotor side, and
a region of the end surface located on an outer side of the recess relative to a central axis of the spacer constitutes a surface coming in contact with the rotor.

2. The spacer according to claim 1, wherein:
the spacer has a conical outer shape; and
the spacer includes a perforated portion, and the central axis of the spacer is disposed on the rotational axis of the rotor.

3. The spacer according to claim 1, wherein the balance correction part is a weight adjustment part that is formed in the spacer so that a center of gravity of the spacer is located on the central axis of the spacer.

4. The spacer according to claim 1, wherein:
the balance correction part includes an excavated portion formed in the spacer, and a burr resulting from formation of the excavated portion; and
the recess is formed so as to have a diameter around the central axis of the spacer, and has a depth that allows the recess to accommodate the burr of the balance correction part.

5. The spacer according to claim 1, wherein the balance correction part is a weight provided inside the recess.

6. An electric supercharger in which a spacer is disposed, to fix a rotor, between the rotor and a bearing disposed in a direction of a rotational axis of the rotor relative to the rotor, the electric supercharger comprising:
a housing that supports a shaft through the bearing and has an air flow passage;
a turbine that is disposed inside the flow passage and fixed at a leading end of the shaft; and
a stator that surrounds the rotor and is fixed to the housing, wherein
an area of an end surface of the spacer on a rotor side is larger than an area of an end surface of the spacer on a bearing side,
the spacer has a tapered surface with a diameter decreasing toward the bearing in an outer circumferential surface of the spacer,
a balance correction part that corrects balance of the spacer is disposed inside a recess formed in the end surface of the spacer on the rotor side, and
a region of the end surface located on an outer side of the recess relative to a central axis of the spacer constitutes a surface coming in contact with the rotor.

7. The electric supercharger according to claim 6, wherein:
the spacer has a conical outer shape; and
the spacer includes a perforated portion that extends through the spacer in a left-right direction of the electric supercharger, and the central axis of the spacer is disposed on the rotational axis of the shaft.

8. The electric supercharger according to claim 6, wherein the balance correction part is a weight adjustment part that is formed in the spacer so that a center of gravity of the spacer is located on the central axis of the spacer.

9. The electric supercharger according to claim 6, wherein:
the balance correction part includes an excavated portion formed in the spacer, and a burr resulting from formation of the excavated portion; and
the recess is formed so as to have a diameter around the central axis of the spacer, and has a depth that allows the recess to accommodate the burr of the balance correction part.

10. The electric supercharger according to claim 6, wherein the balance correction part is a weight provided inside the recess.

* * * * *